UNITED STATES PATENT OFFICE 2,599,028

SOLUBLE INTERPOLYMERS OF TRIS-2-ALKENYL ACONITATES, 2-ALKENYL ALCOHOLS, AND OLEFINIC-BENZENES

Pliny O. Tawney, Passaic, N. J., assignor to United States Rubber Company, New York, N. Y., a corporation of New Jersey No Drawing. Application April 15, 1948, Serial No. 21,321

7 Claims. (Cl. 260—78.5)

This invention relates to a new class of soluble, unsaturated polymeric materials which are prepared by the interpolymerization of a tris-2-alkenyl aconitate with a 2-alkenyl alcohol and styrene or a substituted styrene as hereafter defined. These interpolymers can be converted by heat and/or catalysts to insoluble, essentially infusible products by further polymerization or by copolymerization with other ethylenically unsaturated organic materials capable of addition polymerization.

It is known in the art that tris-2-propenyl aconitates copolymerize with styrene, albeit slowly, to form insoluble, infusible resins before more than a minor proportion of the monomeric materials and particularly the tris-2-propenyl aconitate has been converted to the polymeric form. Hence soluble copolymers can only be obtained by halting the polymerization before gelation occurs. This method is disadvantageous, however, not only because of the low yield of soluble polymer, but also because it necessitates recovery of the monomeric starting materials for use in subsequent polymerization. Moreover, the devices suggested by the prior art as being helpful in securing higher yields of soluble, unsaturated copolymers, viz., the use of higher reaction temperatures, large amounts of catalyst, inhibitors, diluents, etc., offer only a disproportionately small advantage since the resulting improvement in the yield is small or in most cases insignificant and the resulting interpolymers must be further purified to remove solvents, catalyst fragments, inhibitors, etc.

I have now found that the amounts of the monomeric tris-2-alkenyl aconitate and styrene convertible to the soluble, copolymeric form can be very markedly increased by interpolymerization thereof with a 2-alkenyl alcohol from the class of allyl, 2-methallyl, 2-ethallyl, 2-chloroallyl, 2-(hydroxymethyl) allyl, 2-(chloromethyl) allyl, tiglyl, crotyl, 4-chlorocrotyl and cinnamyl alcohols, and preferably those alcohols from the above class which contain a terminal methylene group, e. g., allyl, methallyl and ethallyl alcohols. Suitable tris-2-alkenyl aconitates for use in my invention include the aconitic esters of any of the above-mentioned 2-alkenyl alcohols, those containing a terminal methylene group being preferred, e. g., triallyl aconitate and trimethallyl aconitate. The styrene employed in my invention may be replaced in whole or in part by substituted styrenes from the class of alpha-methylstyrene, p-methylstyrene, p-methoxystyrene, p-chlorostyrene, o,p-dichlorostyrene, p-trichloromethylstyrene, p-fluorostyrene and p-trifluoromethylstyrene.

In contrast to prior art methods, my interpolymerization reaction proceeds smoothly at moderate temperatures and in the absence of solvents, inhibitors or other special reaction conditions and precautions heretofore employed in the art in an attempt to delay or avert gelation. Moreover my new interpolymers are uncontaminated by the insoluble gel encountered in the art and hence extensive purification of my products is unnecessary.

The interpolymerization reactions of my invention are carried out by heating the tris-2-alkenyl aconitate with the 2-alkenyl alcohol and with the styrene or substituted styrene as defined above in the respective molar ratio 1.0:0.4 to 6:0.1 to 5.0. The reaction is carried out at temperatures of from 25–140° C., preferably in the range of 50–110° C. for times sufficient to effect an adequate degree of reaction, such times being within the range of 2–300 hours and usually in the range of 50–200 hours.

The reaction is promoted by a source of free radicals such as a peroxidic compound, among which are the organic peroxides, e. g., acetyl peroxide, benzoyl peroxide and tert.-butyl hydroperoxide, these promoters being employed in amounts of from 0.1–20%, and preferably 1.0–15%, by weight of the reactant mixture.

The course of interpolymerization can be followed by observing the increase in the viscosity of the reaction mixture and the interpolymer can be isolated from the reaction mixture by precipitation through the addition of a non-solvent such as diethyl ether and/or n-hexane. Although unnecessary for many commercial applications, further purification of my interpolymer can be effected by dissolving them in a minimum volume of solvent such as acetone and reprecipitating them with one of the above-mentioned non-solvents. Concentration of the precipitating bath yields a further amount of lower molecular weight interpolymers which are likewise useful in various commercial applications.

My new interpolymers provide an improvement over the binary copolymers of tris-2-propenyl aconitate and a 2-propenyl alcohol since my new interpolymers provide, where desired, a somewhat more flexible product having an essentially high degree of compatibility with cheap aromatic hydrocarbon solvents, e. g., in the preparation of surface coatings. Such coating solutions can be obtained by dissolving my interpolymers in an appropriate solvent or by adding the higher-boiling solvent directly to the crude interpolymerization reaction mixture and removing any unreacted 2-alkenyl alcohol by subsequent distillation.

Alternatively my unsaturated interpolymers can be dissolved in liquid, ethylenically unsaturated compounds such as benzyl acrylate, tolyl acrylate, methyl acrylate, allyl acrylate, butyl methacrylate, vinyl butyrate, diethyl fumarate, and diallyl fumarate. The resulting solutions can be totally polymerized to insoluble, infusible products without leaving any solvents to be evaporated. Such solutions can be employed in casting, laminating and impregnating operations, particularly where articles capable of being preformed and then "set" or cured in a final shape are desired.

My interpolymers can also be employed in the solid form as thermosetting molding powders in the preparation of articles of various shapes, e. g., rods and sheets.

Application of heat, e. g., 60–100° C., to compositions containing my new unsaturated interpolymers, particularly in the presence of a polymerization catalyst or promoter, e. g., a peroxide, effects further polymerization and the resulting products are resistant to heat and to attack by solvents. Suitable inert addends including pigments, dyes, fillers and plasticizers can be incorporated with the interpolymers at the soluble, fusible stage prior to the final cure.

The following examples disclose my invention in more detail. All parts are by weight.

EXAMPLE 1

To demonstrate the improvements achieved by my invention, mixtures of triallyl aconitate and styrene are heated at 60° C. and in the presence of benzoyl peroxide as a promoter, with various 2-alkenyl alcohols, until no further increase in the viscosity of the reaction mixture is perceptible. The reaction products are then isolated from the reaction mixture by the addition of an excess of a mixture of n-hexane and diethyl ether which precipitates the interpolymers. The latter are further purified by dissolving them in a minimum volume of acetone and re-precipitating them with an excess of the hexane-ether mixture after which they are dried in vacuo to constant weight. In Table I below are summarized the amounts of the monomeric starting materials, the peroxide and the polymeric products as well as the reaction times. To further emphasize the advantages of my invention over the prior art, an example of the copolymerization of styrene with triallyl aconitate in the absence of the 2-alkenyl alcohol is likewise included (I–a).

sufficient to effect a significant increase in the amounts of the triallyl aconitate and styrene converted to the soluble, polymeric form before gelation. Succeeding examples, such as I–d, show that not only does the amount of soluble interpolymer obtained by this method increase with the presence of increasing amounts of the 2-alkenyl alcohol but also that in the presence of a sufficient quantity of the latter the major proportion of the triallyl aconitate and the styrene can be converted to the soluble, polymeric form without danger of premature insolubilization.

EXAMPLE 2

A mixture of 100 parts of triallyl aconitate, 25 parts of styrene, 200 parts of allyl alcohol and 2.5 parts of benzoyl peroxide is heated at 60° C. for a total of 336 hours during which time 33.5 parts of benzoyl peroxide are added in increments of 2.5 parts at 24-hour intervals. The reaction mixture is then cooled and poured into a 50:50 mixture of n-hexane and diethyl ether. The precipitated interpolymer is purified by repeated solution in the minimum volume of acetone and reprecipitation of the ether-hexane mixture after which it is dried to constant weight in vacuum to yield approximately 104 parts of soft, solid product.

Analysis: Found, per cent hydroxyl, 1.8; iodine (Wijs) number, 131. The hydroxyl content is derived from the interpolymerized allyl alcohol, and the iodine number indicates the residual unsaturation of the interpolymer which is derived from the interpolymerized triallyl aconitate.

(a) Upon heating at elevated temperatures, e. g., 120° C.–150° C., a sample of the interpolymer is converted to an insoluble and heat-resistant product.

(b) Eighteen parts of the soluble interpolymer are dissolved in 3.0 parts of diethyl fumarate together with 0.1 part of benzoyl peroxide, and the composition is cured in a cylindrical mold by heating at 60° C. for 19.5 hours and then at 90° C. for 5.0 additional hours. The resulting hard, clear casting is resistant to attack by alcohol and acetone.

Having thus described my invention, what I claim and desire to protect by Letters Patent is:

1. A product which is an unsaturated acetone-soluble interpolymerizate of monomers consisting of from 1 to 0.4 molar equivalents of a tris-2-alkenyl aconitate from the class consisting of triallyl aconitate and trimethallyl aconitate, 6 to 0.1 molar equivalents of a 2-alkenyl alcohol from the class consisting of allyl alcohol and methallyl alcohol, and 5 molar equivalents of

*Table I*

| | Triallyl Aconitate | Styrene | 2-Alkenyl Alcohol | | Peroxide | Reaction Time (hours) | Polymeric Product |
|---|---|---|---|---|---|---|---|
| a | 100 | 25 | | | 2.6 | [1,3] 48.0 | 57.0 |
| b | 100 | 25 | Allyl Alcohol | 10.0 | 3.0 | [1] 53.0 | 63.5 |
| c | 100 | 25 | do | 100.0 | [3] 12.0 | [3] 144.0 | 67.5 |
| d | 100 | 25 | do | 200.0 | [2] 36.0 | [2] 336.0 | 104.0 |
| e | 100 | 25 | Methallyl Alcohol | 100.0 | [3] 12.0 | [3] 144.0 | 86.0 |
| f | 100 | 50 | | | 2.8 | [1,3] 48.0 | 82.7 |
| g | 100 | 50 | Allyl Alcohol | 200.0 | [3] 14.0 | [3] 144.0 | 133.8 |

[1] repetition with larger amounts of peroxide effects gelation in less than 48 hours.
[2] no evidence of incipient gelation but no further increase in viscosity detectable.
[3] catalyst added in equal increments at approximately 24-hour intervals.

A comparison of Examples I–a with I–b above shows that even a small amount of the 2-alkenyl alcohol employed according to my invention is a monomeric olefinic-substituted benzene selected from the class consisting of styrene, alpha-methylstyrene, p-methylstyrene, p-methoxystyrene, p-chlorostyrene, o,p-dichlorostyrene, p-trichloromethylstyrene, p-fluorostyrene and p-trifluoromethylstyrene.

2. A method which comprises interpolymerizing, by heating in the presence of a peroxidic polymerization catalyst, a mixture of monomers consisting of a tris-2-alkenyl aconitate from the class consisting of triallyl aconitate and trimethallyl aconitate, a 2-alkenyl alcohol from the class consisting of allyl alcohol and methallyl alcohol and a monomeric olefinic-substituted benzene selected from the class consisting of styrene, alpha-methylstyrene, p-methylstyrene, p-methoxystyrene, p-chlorostyrene, o,p-dichlorostyrene, p-trichloromethylstyrene, p-fluorostyrene and p-trifluoromethylstyrene, in the respective molar ratio of 1.0:0.4 to 6.0:0.1 to 5.0.

3. A product which is an unsaturated acetone-soluble interpolymerizate of monomers consisting of from 1 to 0.4 molar equivalents of a tris-2-alkenyl aconitate from the class consisting of triallyl aconitate and trimethallyl aconitate, 6 to 0.1 molar equivalents of allyl alcohol and 5 molar equivalents of styrene.

4. A product which is an unsaturated acetone-soluble interpolymerizate of monomers consisting of from 1 to 0.4 molar equivalents of a tris-2-alkenyl aconitate from the class consisting of triallyl aconitate and trimethallyl aconitate, 6 to 0.1 molar equivalents of methallyl alcohol and 5 molar equivalents of styrene.

5. A product which is an unsaturated acetone-soluble interpolymerizate of monomers consisting of from 1 to 0.4 molar equivalents of triallyl aconitate, 6 to 0.1 molar equivalents of allyl alcohol and 5 molar equivalents of styrene.

6. A product which is an unsaturated acetone-soluble interpolymerizate of monomers consisting of from 1 to 0.4 molar equivalents of trimethallyl aconitate, 6 to 0.1 molar equivalents of allyl alcohol and 5 molar equivalents of styrene.

7. A product which is an unsaturated acetone-soluble interpolymerizate of monomers consisting of from 1 to 0.4 molar equivalents of triallyl aconitate, 6 to 0.1 molar equivalents of methallyl alcohol and 5 molar equivalents of styrene.

PLINY O. TAWNEY.

REFERENCES CITED

The following references are of record in the file of this patent:

UNITED STATES PATENTS

| Number | Name | Date |
| --- | --- | --- |
| 2,221,663 | Rothrock | Nov. 12, 1940 |
| 2,378,195 | D'Alelio | June 12, 1945 |
| 2,441,515 | Snyder | May 11, 1948 |
| 2,461,735 | Heiberger | Feb. 15, 1949 |
| 2,510,503 | Kropa | June 6, 1950 |